(12) United States Patent
Kasai

(10) Patent No.: US 11,174,390 B2
(45) Date of Patent: Nov. 16, 2021

(54) GARDENIA PIGMENT PREPARATION

(71) Applicant: Riken Vitamin Co., Ltd., Tokyo (JP)

(72) Inventor: Koji Kasai, Kyoto (JP)

(73) Assignee: Riken Vitamin Co., Ltd., Kyoto (JP)

( * ) Notice: Subject to any disclaimer, the term of this patent is extended or adjusted under 35 U.S.C. 154(b) by 203 days.

(21) Appl. No.: 15/761,283

(22) PCT Filed: Sep. 23, 2016

(86) PCT No.: PCT/JP2016/078009
§ 371 (c)(1),
(2) Date: Mar. 19, 2018

(87) PCT Pub. No.: WO2017/057187
PCT Pub. Date: Apr. 6, 2017

(65) Prior Publication Data
US 2018/0258286 A1 Sep. 13, 2018

(30) Foreign Application Priority Data
Sep. 29, 2015 (JP) .............................. JP2015-190850

(51) Int. Cl.
*C09B 61/00* (2006.01)
*A23L 5/43* (2016.01)
*C09B 67/00* (2006.01)

(52) U.S. Cl.
CPC ................ *C09B 61/00* (2013.01); *A23L 5/43* (2016.08); *C09B 67/0001* (2013.01)

(58) Field of Classification Search
CPC ........ A23L 5/43; C09B 61/00; C09B 67/0001
See application file for complete search history.

(56) References Cited

U.S. PATENT DOCUMENTS

2008/0032011 A1* 2/2008 Liniger ................... A23L 27/70
426/250

FOREIGN PATENT DOCUMENTS

| CN | 1732894 A | 2/2006 |
|---|---|---|
| CN | 103583932 A | 2/2014 |
| DE | 42 00 349 A1 | 7/1993 |
| JP | 56-92792 A | 7/1981 |
| JP | S58 13367 A | 1/1983 |
| JP | S59 41364 A | 3/1984 |
| JP | 60-75256 A | 4/1985 |
| JP | 1-141571 A | 6/1989 |
| JP | 5-32909 A | 2/1993 |
| JP | 7-310023 A | 11/1995 |
| JP | 2001-64531 A | 3/2001 |
| JP | 2008-127505 A | 6/2008 |
| JP | 4374494 B2 | 9/2009 |
| JP | 2010-47625 A | 3/2010 |
| JP | 2012-51114 A | 3/2012 |
| JP | 2012-67241 A | 4/2012 |
| JP | 2014-57531 A | 4/2014 |
| JP | 2015-91946 A | 5/2015 |
| KR | 2013 0103645 A | 9/2013 |
| WO | WO 03/029358 A1 | 4/2003 |

OTHER PUBLICATIONS

CN 105623304 A Abstract and Summary in English (Year: 2016).*
Tamura et al. JP2001064531 A (Year: 2001)-full translation.*
Extended European Search Report issued in corresponding European Patent Application No. 16851361.2 dated Jan. 31, 2019.
International Preliminary Report on Patentability for PCT/JP2016/078009 dated Apr. 12, 2018.
Takami, Masaaki et al., "Hydrophobic Blue Pigment Formation from Phosphatidylgenipin" J. Nutr. Sci. Vitaminol., 1994, pp. 505-509, vol. 40.
International Search Report for PCT/JP2016/078009 dated Nov. 1, 2016.
Japan's Specifications and Standards for Food Additives (ninth Edition), 2018, The Ministry of Health, Labor and Welfare, The Consumer Affairs Agency in 4 pages.
Chocolate Sandwich Biscuits with Raspberry and Blueberry Flavoured Fillings, Mintel GNPD, [online], ID3172639, Jun. 2015, https://www.gnpd.com/sinatra/recordpage/3172639/from_search/zOtlQlpAvL/?page=1.
Nuts and Chocolate Trail Mix, Mintel GNPD, [online], ID3293029, Jul. 2015, https://www.gnpd.com/sinatra/recordpage/3293029/from_search/zOtlQipAvL/?page=1.
Blueberry Greek Yogurt Chocolate Balls, Mintel GNPD, [online], ID3293205, Jul. 2015, https//:www.gnpd.com/sinatra/recordpage/3293205/from_search/zOtlQlpAvL/?page=1.

\* cited by examiner

*Primary Examiner* — Subbalakshmi Prakash
(74) *Attorney, Agent, or Firm* — Knobbe Martens Olson & Bear LLP

(57) ABSTRACT

Provided is a *Gardenia* pigment preparation that can stably maintain a dissolved state of *Gardenia* blue pigment in an acidic range. The *Gardenia* pigment preparation comprises *Gardenia* blue pigment and lecithin.

1 Claim, No Drawings

GARDENIA PIGMENT PREPARATION

CROSS REFERENCE TO RELATED APPLICATIONS

This application is a U.S. National Phase Application of PCT International Application Number PCT/JP2016/078009, filed on Sep. 23, 2016, designating the United States of America and published in the Japanese language, which is an International Application of and claims the benefit of priority to Japanese Patent Application No. 2015-190850, filed on Sep. 29, 2015. The disclosures of the above-referenced applications are hereby expressly incorporated by reference in their entireties.

TECHNICAL FIELD

The present invention relates to a *Gardenia* pigment preparation.

BACKGROUND ART

*Gardenia* blue pigment has been widely used as a blue colorant for food. *Gardenia* blue pigment is generally produced by enzymatic treatment of iridoid glycosides present in *Gardenia* fruit extracts and the like with β-glucosidase in the presence of proteolytic products.

Known art relating to *Gardenia* blue pigment includes:

a method for producing a brighter blue natural pigment from a *Gardenia* iridoid glycoside with use of β-glucosidase, the method comprising treating a *Gardenia* iridoid glycoside or a *Gardenia* iridoid glycoside-containing substance with β-glucosidase or a β-glucosidase-containing substance in the presence of a primary amino group-containing substance under aerobic conditions, the method being characterized in that the glycoside or the glycoside-containing substance is sufficiently treated with the β-glucosidase or the β-glucosidase-containing substance under microaerobic conditions beforehand, and then further treated similarly under stirring (see Patent Literature 1);

a *Gardenia* blue pigment preparation with an improved color tone, which preparation is obtained by extracting an iridoid glycoside from fruits of *Gardenia jasminoides* (Rubiaceae), treating the iridoid glycoside with β-glucosidase in the presence of a soybean protein degradation product (in the absence of taurine-containing substances) for preparation of *Gardenia* blue pigment, and blending the *Gardenia* blue pigment with an enzymatically modified isoquercitrin (see Patent Literature 2);

a method for producing *Gardenia* blue pigment, comprising treating an iridoid glycoside with β-glucosidase in the presence of a protein hydrolysate and subjecting the treated solution to membrane separation using a membrane with a molecular weight cut-off of 3000 or larger to remove low-molecular compounds from the treated solution (see Patent Literature 3); and a method for producing *Gardenia* blue pigment, comprising treating an iridoid glycoside with β-glucosidase in the presence of an acid- or protease-hydrolyzed casein (see Patent Literature 4).

However, *Gardenia* blue pigment tends to be insolubilized in an acidic range and difficult to use in acidic food or drink products. For this reason, there has always been a need for *Gardenia* pigment preparations that are highly acid-resistant and can stably maintain a dissolved state of *Gardenia* blue pigment even in an acidic range.

CITATION LIST

Patent Literature

Patent Literature 1: JP-A 56-92792
Patent Literature 2: JP 4374494
Patent Literature 3: JP-A 2012-67241
Patent Literature 4: JP-A 2014-57531

SUMMARY OF INVENTION

Technical Problem

An object of the present invention is to provide a *Gardenia* pigment preparation that can stably maintain a dissolved state of *Gardenia* blue pigment in an acidic range.

Solution to Problem

The present inventor conducted intensive research to achieve the above-mentioned object. As a result, the present inventor found that a *Gardenia* pigment preparation containing lecithin can achieve the object. Based on this finding, the present inventor completed the present invention.

That is, the present invention includes the following.

(1) A *Gardenia* pigment preparation (composition) comprising *Gardenia* blue pigment and lecithin.
(2) The *Gardenia* pigment preparation according to the above (1), wherein the lecithin is an enzymatically decomposed lecithin.
(3) The *Gardenia* pigment preparation according to the above (1) or (2), wherein the mass ratio of the *Gardenia* blue pigment (in terms of a *Gardenia* blue pigment having a color value of 500) and the lecithin (*Gardenia* blue pigment/lecithin ratio) is 0.5/1 to 30/1.
(4) A food or drink product comprising the *Gardenia* pigment preparation according to any one of the above (1) to (3).
(5) The food or drink product according to the above (4), wherein the product is an acidic food or drink product.

Advantageous Effects of Invention

The *Gardenia* pigment preparation of the present invention can stably maintain a dissolved state of *Gardenia* blue pigment in an acidic range.

The *Gardenia* pigment preparation of the present invention is suitable for use in acidic food or drink products and the like.

DESCRIPTION OF EMBODIMENTS

The *Gardenia* blue pigment used in the present invention is a water-soluble blue pigment prepared by treating an iridoid glycoside with β-glucosidase in the presence of a proteolytic product.

The proteolytic product is a product resulting from degradation of proteins. The degradation method may be hydrolysis with acids, alkalis, enzymes or the like, microbial fermentation, pyrolysis or physical decomposition, but preferred is hydrolysis. As the proteolytic product, proteolytic products derived from various animals and plants can be used. The animal-derived proteolytic products include, for example, degradation products of milk protein and degradation products of scleroproteins such as collagen. The plant-derived proteolytic products include degradation products of proteins of wheat, soybeans, corn, potatoes, rice, wakame seaweed, sesame seeds and green peas.

In terms of the degree of protein degradation, the proteolytic product is preferably, for example, amino acids or amino acid salts derived from a protein by cleavage of all peptide bonds (that is, proteolytic products having about 1 amino acid residue), or peptides which are derived from a protein by cleavage of some of the peptide bonds and have 2 to 10 amino acid residues, preferably 2 to 5 amino acid residues, more preferably 2 to 4 amino acid residues, particularly preferably 2 to 3 amino acid residues.

The iridoid glycoside is not particularly limited as long as the iridoid glycoside is obtained by extraction from fruits of *Gardenia jasminoides* (*Gardenia augusta* MERRIL var. *grandiflora* HORT. or *Gardenia jasminoides* ELLIS) in the family Rubiaceae. For example, geniposide is preferably used.

The method for extracting geniposide from the *Gardenia* fruits is not limited, and known methods can be used. For example, dried *Gardenia* fruits are ground and subjected to extraction with water, an alcohol or an aqueous alcohol solution. As for the extraction conditions, for example, when a 50 vol % aqueous alcohol solution is used for extraction, extraction is performed preferably at room temperature (0 to 30° C.) to 50° C. for 1 to 18 hours, more preferably at 30 to 40° C. for 2 to 4 hours. This extraction procedure is usually repeated more than once for enhancing the extraction rate of geniposide from the ground dried fruits. The obtained geniposide-containing extract is concentrated according to a method known per se, and the concentrate is usually refrigerated or frozen for storage.

The concentrate is usually treated with an adsorbent for removal of ingredients except geniposide, including the yellow pigment crocin. For example, treatment with an adsorption resin is performed as follows.

First, the concentrate is diluted to a suitable concentration, and the dilution is applied to a column filled up with an adsorption resin. Examples of the adsorption resin include porous resins such as Amberlite XAD-4 and Amberlite XAD-7 (product names; manufactured by ORGANO CORPORATION), DIAION HP-20, HP-21 and HP-40 (product names; manufactured by Mitsubishi Chemical Corporation), and the like. Amberlite XAD-7 is preferably used.

Next, water or a mixed solvent of a low-concentration alcohol (e.g., ethanol etc.) and water is passed through the column, and the unadsorbed and eluted fractions are collected. Thus, geniposide-containing fractions can be obtained. These fractions are concentrated according to a method known per se, and the concentrate is usually refrigerated or frozen for storage.

The β-glucosidase is not particularly limited as long as it has β-glucosidase activity. For example, β-glucosidases of *Aspergillus niger, Trichoderma reesei, Trichoderma viride*, almonds and the like can be used. Commercially produced and sold β-glucosidases include, for example, Sumizyme C6000, Sumizyme AC, Sumizyme C, Sumizyme X, Sumizyme BGT and Sumizyme BGA (trade names; manufactured by SHINNIHON CHEMICALS Corporation); Cellulosin AC40, Cellulosin T3 and Cellulosin AL (trade names; manufactured by HBI Enzymes Inc.); Cellulase "ONOZUKA" 3S and Cellulase Y-NC (trade names; manufactured by Yakult Pharmaceutical Industry Co., Ltd.); and Cellulase A "Amano" 3 and Cellulase T "Amano" 4 (trade names; manufactured by Amano Enzyme Inc.). These can be used in the present invention.

The method of the β-glucosidase treatment is not particularly limited as long as the method can produce *Gardenia* blue pigment. For example, the protein hydrolysate specified in the present invention, the iridoid glycoside and water are mixed to prepare an aqueous solution, β-glucosidase is added to the aqueous solution, and the mixture is stirred or shaked.

The conditions for the β-glucosidase treatment can be as follows: the temperature is usually 20 to 70° C., and preferably 40 to 60° C.; the pH is usually 4 to 6, and preferably 4.5 to 5.5; and the reaction duration is usually 30 minutes to 100 hours, and preferably 15 to 80 hours.

For the pH adjustment in the β-glucosidase treatment, it is preferable to add an appropriate amount of an acid agent (e.g., an inorganic acid such as hydrochloric acid, an organic acid such as citric acid, or the like) to the aqueous solution before addition of β-glucosidase.

The β-glucosidase treatment is preferably performed under aerobic conditions. The aerobic conditions can be maintained, for example by mechanical means such as stirring and shaking, or by injection of a molecular oxygen-containing gas such as air.

The mode of addition of β-glucosidase is not particularly limited, and for example, β-glucosidase may be directly added at once. Alternatively, an aqueous solution of β-glucosidase may be prepared and added at once or in 2 to 50 divided portions.

The aqueous solution to be treated with β-glucosidase is preferably prepared such that the protein hydrolysate specified in the present invention is present in an amount of 0.5 to 20% by mass, preferably 1 to 10% by mass; and the iridoid glycoside is present in an amount of 1 to 20% by mass, preferably 4 to 15% by mass in the aqueous solution, the amount of which is expressed as 100% by mass. The amount of the β-glucosidase added to the aqueous solution is preferably 0.01 to 1.0 g relative to 1 g of the iridoid glycoside.

The lecithin used in the present invention is mainly composed of phospholipids from oil seeds or animal sources (e.g., phosphatidylcholine, phosphatidylethanolamine, phosphatidylinositol, phosphatidic acid, or substances derived therefrom by enzymatic treatment (e.g., lysophosphatidylcholine, which is an enzymatic digest of phosphatidylcholine, or the like)). Examples of the lecithin include an oil-containing liquid lecithin such as soybean lecithin or yolk lecithin; a powdered lecithin obtained by deoiling and drying of a liquid lecithin; a fractionated lecithin obtained by fractional purification of a liquid lecithin; and an enzymatically decomposed lecithin or an enzymatically modified lecithin, which is obtained by enzymatic treatment of lecithin. Particularly preferred is an enzymatically decomposed lecithin because the use of this kind of lecithin contributes to producing the effect of the present invention to the full extent.

The enzymatically decomposed lecithin is, for example, one which has a phospholipid content of 95 to 98% by mass and a lysophosphatidylcholine content of 18 to 30% by mass (so-called high-purity powdered lysolecithin) or one which has a phospholipid content of 90 to 95% by mass and a lysophosphatidylcholine content of 65 to 75% by mass (so-called LPC enriched lysolecithin). In the case where amino acids or amino acid salts derived from a protein by cleavage of all peptide bonds (that is, proteolytic products having about 1 amino acid residue) are used as the proteolytic product in the production of the *Gardenia* blue pigment used in the present invention, the lecithin used in the production of the *Gardenia* pigment preparation of the present invention is preferably a high-purity powdered lysolecithin. In the case where peptides having 2 to 10 amino acid residues (preferably 2 to 5, more preferably 2 to 4, particularly preferably 2 to 3 amino acid residues) are used as the proteolytic product in the production of the *Gardenia* blue pigment used in the present invention, the lecithin used in the production of the *Gardenia* pigment preparation of the present invention is preferably an LPC enriched lysolecithin. Such an appropriate selection of the type of the lecithin in the *Gardenia* pigment preparation of the present invention contributes to producing the effect of the present invention to the full extent.

As long as the *Gardenia* pigment preparation of the present invention comprises the above-described *Gardenia* blue pigment and lecithin, the production method, the dosage form and the like of the preparation are not particularly limited. For example, a liquid preparation can be produced by dissolving the *Gardenia* blue pigment and the lecithin in a solvent in a dissolution tank. Examples of the solvent include water and an aqueous alcohol solution. When an aqueous alcohol solution is used as the solvent, the type of the alcohol mixed with water is preferably ethanol. The alcohol concentration of the aqueous alcohol solution is preferably 1 to 50 vol %.

The amounts of the *Gardenia* blue pigment and the lecithin in the *Gardenia* pigment preparation of the present invention are not particularly limited, but the *Gardenia* blue pigment (in terms of a *Gardenia* blue pigment having a color value of 500) is usually present in an amount of 5 to 80% by mass, preferably 8 to 20% by mass, and the lecithin is usually present in an amount of 1 to 20% by mass, preferably 2 to 15% by mass, more preferably 4 to 10% by mass in the *Gardenia* pigment preparation, the amount of which is expressed as 100% by mass.

The mass ratio of the *Gardenia* blue pigment (in terms of a *Gardenia* blue pigment having a color value of 500) and the lecithin (*Gardenia* blue pigment/lecithin ratio) in the *Gardenia* pigment preparation of the present invention is, for example, about 0.1/1 to 50/1 (e.g., 0.3/1 to 40/1), preferably about 0.5/1 to 30/1 (e.g., 0.7/1 to 20/1), and more preferably about 1/1 to 10/1 (e.g., 1.5/1 to 8/1).

The *Gardenia* pigment preparation of the present invention may be produced in a powder or granular form by drying the above-mentioned liquid preparation according to a method known per se. Examples of the drying method include vacuum-freeze drying, aeration drying, spray drying, vacuum drying, belt drying, shelf drying and drum drying. Preferred is vacuum-freeze drying. The loss-on-drying of the *Gardenia* pigment preparation in a powder or granular form is usually 5% by mass or less, and preferably 1 to 3% by mass.

In the production of the *Gardenia* pigment preparation of the present invention, the *Gardenia* blue pigment and the lecithin may be mixed with an additive such as a filler, a disintegrant, a binder, a surfactant, an emulsifier, a wetting agent, a lubricant, a saccharide, a pH adjuster, a preservative, a flavor and/or a colorant, as long as the additive does not interfere with the achievement of the object of the present invention.

There is no particular limitation on the application of the *Gardenia* pigment preparation of the present invention. For example, the *Gardenia* pigment preparation can be used for coloring of food or drink products or pharmaceutical products. There is no particular limitation on the food or drink products to be colored, and examples include frozen desserts such as ice cream products categorized as ice cream, "ice milk" or "facto-ice", sherbet and flavored ice; drinks such as a milk drink, a lactic acid bacteria drink, a soft drink, a carbonated drink, a fruit juice drink, a vegetable juice drink, a sport drink, a powdered drink, a jelly drink, an alcoholic drink, a coffee drink and a tea drink; desserts such as pudding, jelly and yogurt; confectioneries such as chewing gums, chocolate, drops, hard candies, cookies, rice crackers, gummy candies and jelly beans; jams such as strawberry jam and blueberry jam; sauces such as fruit-flavored sauces; soups; pickles; seasonings such as dressing and sauce; processed meat products such as hams and sausages; and fish jelly products such as fish sausages and fish cakes. There is also no particular limitation on the pharmaceutical products to be colored, and examples include antipyretic analgesics, antihistamines, antiallergics, sympathomimetics, parasympatholytics, central nervous system stimulants, H2 blockers, antacids, anti-inflammatory enzyme preparations, anti-inflammatory agents, bronchodilators, antimicrobials, antitussives, expectorants, anticholinergics, antidiarrheals, sedative-hypnotics, cholagogues, antihypertensives, skeletal muscle relaxants, preventive and therapeutic drugs for motion sickness, vitamins and herbal medicines.

Since the *Gardenia* pigment preparation obtainable according to the present invention can stably maintain a dissolved state of *Gardenia* blue pigment in an acidic range (e.g., pH 2.0 to 5.0), the *Gardenia* pigment preparation is particularly suitable for use in coloring of acidic food or drink products among the food or drink products mentioned above. Here, the acidic food or drink product refers to a food or drink product which contains an acid agent and has acid taste and/or acid smell, and the pH usually ranges 2.0 to 5.0. As for the pH measurement of the acidic food or drink product, in the case where the acidic food or drink product is a liquid or a paste, the product is directly subjected to pH measurement, and in the case where the acidic food or drink product is a solid, water is added to the product to prepare a 10 (w/w) % aqueous solution and the solution is subjected to pH measurement. As the instrument for the pH measurement, a pH meter based on the glass electrode method can be used, for example.

Examples of the acidic food or drink product include frozen desserts such as ice cream products categorized as "facto-ice", sherbet and flavored ice; drinks such as a lactic acid bacteria drink, a soft drink, a carbonated drink, a fruit juice drink, a fruit-flavored drink without juice, a fruit juice, a vegetable juice drink, a sport drink, a powdered drink, a jelly drink and an alcoholic drink; desserts such as jelly and yogurt; confectioneries such as drops, hard candies, gummy candies and jelly beans; jams such as strawberry jam and blueberry jam; sauces such as fruit-flavored sauces; pickles; and seasonings such as dressing.

Hereinafter, the present invention will be described in detail by examples, but the present invention is not limited thereto.

EXAMPLES

Production Example 1

Preparation of Geniposide Concentrate

To 7200 g of dried ground *Gardenia* fruits, 28800 mL of a 40 vol % aqueous ethanol solution was added, and the mixture was stirred at room temperature for 3 hours and then subjected to suction filtration. Next, to the extraction residue, 13200 mL of a 40 vol % aqueous ethanol solution was added, and the mixture was stirred at room temperature for 30 minutes and then subjected to suction filtration. This step was repeated one more time. In total, 42000 mL of the filtrate was obtained as an extract from the *Gardenia* fruits. This extract was concentrated at 60° C. and 4 kPa with use of a rotary evaporator, and thus about 2000 mL of the concentrate containing geniposide was obtained.

To the concentrate, water was added to make a total volume of 4000 mL, and the dilution was loaded onto a column filled up with 12000 mL of Amberlite XAD-7 (product name; manufactured by ORGANO CORPORATION) at a flow rate of SV=0.5. After that, 96000 mL of water was passed through the column at a flow rate of SV=0.5, and the eluate was collected. The collected eluate was concentrated at 60° C. and 4 kPa with use of a rotary evaporator, and thus 360 g of the concentrate containing 43.9% geniposide was obtained.

Production Example 2

Preparation of *Gardenia* Blue Pigment 15.7 g of a proteolytic product (trade name: Pro Ekisu G2; from corn; the number of amino acid residues is about 1; manufactured by BANSYU CHOMIRYO CO., LTD.), 108.4 g of the geniposide concentrate obtained in Production Example 1 and 311.6 g of water were mixed to prepare an aqueous solution, and the pH of the aqueous solution was adjusted to 4.5 with citric acid. To the aqueous solution, 2.9 g of β-glucosidase (trade name: Sumizyme C6000; manufactured by SHINNIHON CHEMICALS Corporation) was added, and then water was added to adjust the total amount to 500.0 g. β-glucosidase treatment was continued at 50° C. for 72 hours, followed by heating at 90° C. for 15 minutes to inactivate the enzyme, and then insoluble matter was filtered off. Thus, 411.2 g of *Gardenia* blue pigment (sample 1; color value ($E^{10\%}_{1cm}$)=102.4) was obtained.

Production Example 3

Preparation of *Gardenia* Blue Pigment 76.1 g of a protein enzymatic hydrolysate (trade name: HI-NUTE R; from soybeans; the number of amino acid residues is 3 to 4; manufactured by FUJI OIL Co., Ltd.), 108.4 g of the geniposide concentrate obtained in Production Example 1 and 270.4 g of water were mixed to prepare an aqueous solution, and the pH of the aqueous solution was adjusted to 7.0 with sodium hydroxide. To the aqueous solution, 2.9 g of β-glucosidase (trade name: Sumizyme C6000; manufactured by SHINNIHON CHEMICALS Corporation) was added, and then water was added to adjust the total amount to 500.0 g. β-glucosidase treatment was continued at 50° C. for 72 hours, followed by heating at 90° C. for 15 minutes to inactivate the enzyme, and then insoluble matter was filtered off. Thus, 402.6 g of *Gardenia* blue pigment (sample 2; color value ($E^{10\%}_{1cm}$)=158.6) was obtained.

Production of *Gardenia* Pigment Preparations
(1) Ingredients
1) *Gardenia* blue pigment (samples 1 and 2)
2) Enzymatically decomposed lecithin
(commercial product 1; trade name: SLP-White Lyso; high-purity powdered lysolecithin; manufactured by Tsuji Oil Mills Co., Ltd.)
3) Enzymatically Decomposed Lecithin
(commercial product 2; trade name: SLP-LPC70; LPC enriched lysolecithin; manufactured by Tsuji Oil Mills Co., Ltd.)
4) Ion Exchanged Water
(2) Compositions of Preparations The compositions of *Gardenia* pigment preparations 1 to 4 to be prepared from the above ingredients are shown in Table 1. The *Gardenia* pigment preparations 1 and 2 are examples of the present invention, and the *Gardenia* pigment preparations 3 and 4 are comparative examples.

TABLE 1

| Ingredient | % by mass *Gardenia* pigment preparation | | | |
|---|---|---|---|---|
| | 1 | 2 | 3 | 4 |
| *Gardenia* blue pigment (sample 1) | 48.8 | — | 48.8 | — |
| *Gardenia* blue pigment (sample 2) | — | 31.5 | — | 31.5 |
| Enzymatically decomposed lecithin (commercial product 1) | 5.0 | — | — | — |
| Enzymatically decomposed lecithin (commercial product 2) | — | 5.0 | — | — |
| Ion exchanged water | 46.2 | 63.5 | 51.2 | 68.5 |

(3) Production Method of Preparations

Based on the ingredient compositions shown in Table 1, the *Gardenia* blue pigment and the enzymatically decomposed lecithin were dissolved in ion exchanged water to give 1 kg each of *Gardenia* pigment preparations 1 to 4. The ingredient compositions of the *Gardenia* pigment preparations 1 to 4 were previously determined such that all these preparations would have a color value ($E^{10\%}_{1cm}$) of 50.

Test Example
Acid-Resistance Evaluation Test

Each *Gardenia* pigment preparation (each of the preparations 1 to 4) was dissolved in a McIlvaine buffer solution with pH 2.8 to prepare a 50-mL test solution having a color value ($E^{10\%}_{1cm}$) of 0.1. Each test solution was heat sterilized at 90° C. for 15 minutes, and then allowed to stand at 30° C. for 15 hours. After that, part of the test solution was filtered with a membrane filter (trade name: DISMIC-25CS; pore size: 0.8 μm; manufactured by ADVANTEC) to remove an insolubilized form of *Gardenia* blue pigment. The absorbances at the absorption maximum wavelength of the unfiltered test solution and the filtrate were measured. The absorbance at the absorption maximum wavelength of the unfiltered test solution was designated as A, the absorbance at the absorption maximum wavelength of the filtrate was designated as B, and the percent reduction in absorbance (%) was determined by the formula shown below. The results are shown in Table 2.

Percent reduction in absorbance (%)=100−(B/A×100)

TABLE 2

| | *Gardenia* pigment preparation | Percent reduction in absorbance (%) |
|---|---|---|
| Examples of present invention | 1 | 0.72 |
| | 2 | 1.02 |
| Comparative examples | 3 | 6.81 |
| | 4 | 8.63 |

As is clear from the results in Table 2, the *Gardenia* pigment preparations 1 and 2 of the present invention, even in an acidic solution with pH 2.8, showed only a slight percent reduction in absorbance after heat sterilization and were highly acid-resistant. In contrast, both of the *Gardenia* pigment preparations 3 and 4 of the comparative examples showed a greater percent reduction in absorbance and were inferior in acid-resistance as compared with the *Gardenia* pigment preparations of the present invention.

The invention claimed is:
1. A *Gardenia* pigment preparation comprising *Gardenia* blue pigment and an enzymatically decomposed lecithin, wherein the enzymatically decomposed lecithin is selected from high purity powdered lysolecithin and lysophosphatidylcholine (LPC) enriched lysolecithin, wherein the mass ratio of the *Gardenia* blue pigment and the enzymatically decomposed lecithin is 0.5/1 to 10/1 *Gardenia* blue pigment/lecithin when the *Gardenia* blue pigment has a color value of 500, wherein the color value is expressed as ($E^{10\%}_{1cm}$), and wherein the *Gardenia* blue pigment is stable when the *Gardenia* pigment preparation is at a pH from 2.0 to 5.0.

\* \* \* \* \*